Figure 1:
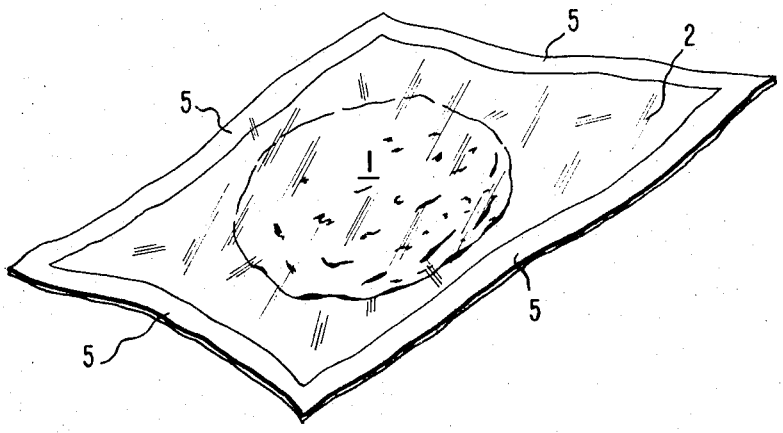
Figure 2:
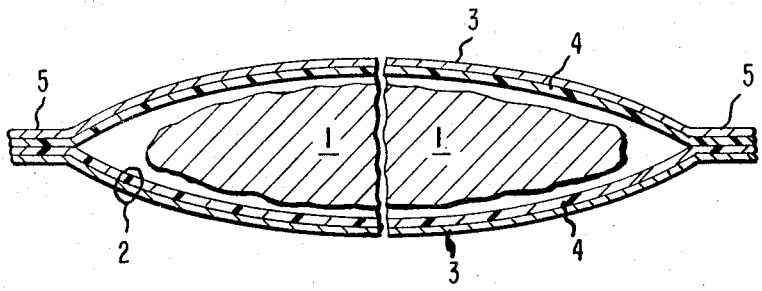

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 400

T914,010

NONMETALLIC PLASTIC AND GLASS FIBER TOASTER PACKAGE

William L. Hamilton, Wilmington, Del., and William E. Lindsey, Richmond, Va., assignors to E. I. du Pont de Nemours and Company, Wilmington, Del.

Continuation of abandoned application Ser. No. 189,814, Oct. 18, 1971. This application May 4, 1973, Ser. No. 357,090

Int. Cl. B65b *25/22*

U.S. Cl. 99—171 H

1 Sheet Drawing. 7 Pages Specification

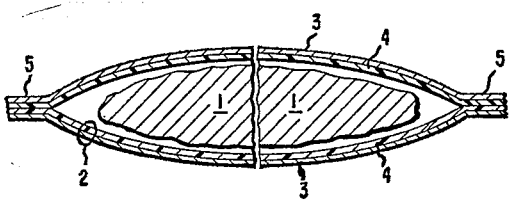

An oil and heat resistant food package for use in a toaster comprising a pouch and a food article in said pouch. The pouch is prepared from two sheets of laminate 2, the laminate being composed of a glass fiber material 3 and a polysulfone layer 4, the polysulfone surfaces of the two sheets being bonded together around the perimeter 5. The glass fiber material used consists essentially of silica glass in the form of a sheet material such as paper, cloth, felt, nonwoven fabric or scrim. The polysulfone can be applied to the glass sheet as a separate film layer or as a coating.

Sept. 11, 1973 W. L. HAMILTON ET AL T914,010

NONMETALLIC, PLASTIC AND GLASS FIBER TOASTER PACKAGE

Original Filed Oct. 18, 1971

INVENTORS
WILLIAM L. HAMILTON
WILLIAM B. LINDSEY

BY Donald W. Huntley
ATTORNEY